United States Patent [19]

Rapp

[11] 4,140,957
[45] Feb. 20, 1979

[54] CALCULATOR DRIVING AND BATTERY PACK RECHARGING CIRCUIT
[75] Inventor: Keith D. Rapp, Fullerton, Calif.
[73] Assignee: Rockwell International Corporation, El Segundo, Calif.
[21] Appl. No.: 808,414
[22] Filed: Jun. 20, 1977
[51] Int. Cl.² .............................................. H02J 7/00
[52] U.S. Cl. .......................................... 320/2; 320/6; 429/9
[58] Field of Search ................................ 320/11, 2–5, 320/6; 429/7, 9, 97; 364/705, 707

[56] References Cited
U.S. PATENT DOCUMENTS 3,013,198  12/1961  Witte et al. ............................. 320/2
3,070,748  12/1962  Worobey et al. ....................... 320/2

FOREIGN PATENT DOCUMENTS 2362243  12/1973  Fed. Rep. of Germany .............. 320/2
2502512  1/1975   Fed. Rep. of Germany .............. 429/97
1419828  12/1975  United Kingdom ....................... 320/2

Primary Examiner—Robert J. Hickey
Attorney, Agent, or Firm—H. Fredrick Hamann; G. Donald Weber, Jr.; Morland Charles Fischer

[57] ABSTRACT

A circuit to conveniently and safely drive an electronic calculator from a source of ac power or, alternately, from either one of a plurality of disposable batteries or a unique, rechargeable battery pack. The present circuit includes an arrangement of contact means particularly positioned in a predetermined relationship within the battery compartment of the calculator and on the rechargeable battery pack. When disposable batteries are deposited inside the battery compartment of the calculator and an ac adapter accessory is connected to provide power to the calculator, the disposable batteries are electrically isolated from the ac source. However, when the rechargeable battery pack is deposited inside the battery compartment of the calculator and the ac adapter is connected to provide power to the calculator, the battery pack is recharged.

5 Claims, 5 Drawing Figures

CALCULATOR DRIVING AND BATTERY PACK RECHARGING CIRCUIT

BACKGROUND OF THE INVENTION

1. Field of the Invention

This invention relates to an electronic calculator driving and battery pack recharging circuit to conveniently and safely drive an electronic calculator from a supply of dc voltage or from either one of a plurality of disposable batteries or a rechargeable battery pack.

2. Description of the Prior Art

As will be understood by those skilled in the art, there are presently two well known types of battery classifications, primary battery cells and secondary battery cells. Primary battery cells typically cannot be recharged and are discarded after use. Secondary battery cells can be typically recharged for continued reuse many times. The primary battery cells cannot be recharged, inasmuch as primary cells, which are subjected to a voltage charge applied across the terminals thereof, can explode. Thus, conventional electronic calculators which utilize disposable batteries as a source of power are designed so that the rectified output from an ac adapter accessory cannot be placed across the terminals of the primary cells. Moreover, other conventional calculators which utilize rechargeable batteries as a source of power are inconveniently designed so that the secondary cells are not accessible and cannot be easily replaced or repaired by the user. The inconvenient design of conventional calculators occurs as the result of the calculator manufacturers attempt to prevent the user from either intentionally or inadvertently installing disposable primary battery cells in a calculator designed to use only rechargeable secondary battery cells and, consequently, causing possible harm to the user or to the calculator, if the primary battery cells should explode.

In most instances, in order to obtain the advantages offered by both rechargeable battery pack powered and disposable battery powered calculators, two separate calculators must be purchased by the user. Those calculators which have dual primary and secondary battery capabilities require that the user follow special procedures to prevent the possibility of charging the disposable primary battery cells. Consequently, both the cost and the effort required to operate the prior art calculators are undesirably increased.

SUMMARY OF THE INVENTION

Briefly, and in general terms, an electronic calculator driving and battery pack recharging circuit is disclosed. A unique battery pack, which contains rechargeable battery cells, includes an external contact positioned on the outside surface thereof. Contacts are also positioned in the calculator battery compartment to interface with the terminals of either the rechargeable battery cells or a plurality of disposable battery cells for the purpose of conducting power from the batteries to the calculator circuitry. What is more, an additional contact is located inside the calculator battery compartment to interface with the external contact of the battery pack to, thereby, complete the calculator driving and battery pack recharging circuit and recharge the battery pack. This additional contact is positioned so that the portion of the driving and battery pack recharging circuit having the battery source is electrically disabled when disposable batteries are otherwise contained by the calculator battery compartment. Hence, the disposable batteries cannot be recharged, which substantially eliminates the danger of explosion that could be caused by intentionally or inadvertently attempting to recharge disposable battery cells.

BRIEF DESCRIPTION OF THE DRAWINGS

FIGS. 2b and 2c are top and bottom views of the rechargeable battery pack of FIG. 2a.

DESCRIPTION OF THE PREFERRED EMBODIMENT

Figure 1:
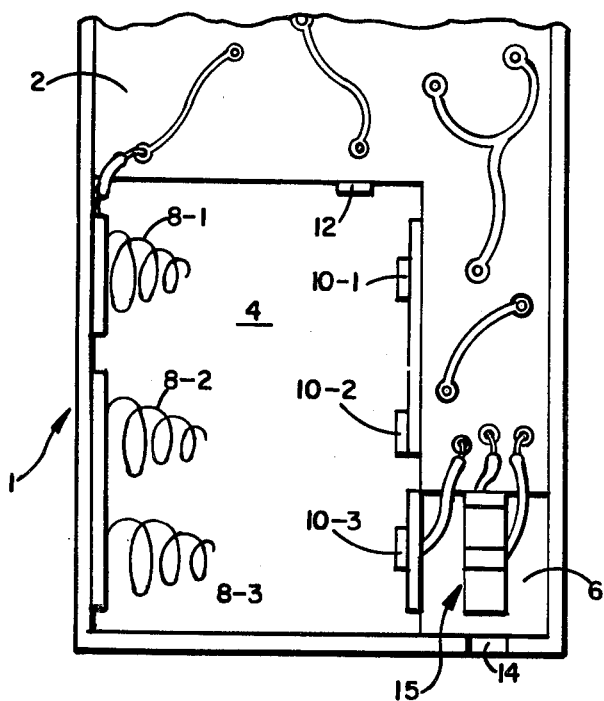
FIG. 1 is a partial plan view of the bottom of an electronic calculator with the rear casing removed.

FIG. 1 shows the bottom of an electronic calculator 1 with the rear casing removed. The calculator includes a printed circuit board 2, of conventional design, a battery compartment 4, and a compartment 6 to receive the jack from an ac power adapter accessory. The battery compartment 4 is particularly formed to receive either one of a plurality of primary battery cells (which cells are used up and discarded) or a pack of secondary battery cells (which cells are adapted to be recharged). The battery compartment 4 includes a set of coil spring contacts 8-1, 8-2 and 8-3 and a corresponding set of contact points 10-1, 10-2 and 10-3. The respective sets of coil springs and contact points are aligned with one another to interface with the terminals of either one of the disposable battery cells or the rechargeable battery pack for conducting power from the batteries to drive the calculator circuits. The battery compartment 4 includes an additional contact strip 12. As will be explained in greater detail hereinafter, the contact strip 12 is adapted to interface with a corresponding contact strip formed in the rechargeable battery pack (best shown in FIGS. 2a–2c) to complete a portion of the calculator driving and battery pack recharging circuit (best shown in FIG. 3), whereby the secondary battery cells which comprise the battery pack are recharged.

The compartment 6 includes a receptacle 14 adapted to receive the jack (not shown) of an ac power adapter. Receptacle 14 may be typically formed within the calculator casing. Compartment 6 also includes a movable, flat spring contact 15. As will be explained in greater detail hereinafter, the flat spring 15 is adapted to be contacted and displaced whenever the ac adapter jack is inserted into and received by the receptacle 14 to provide an external source of power to drive the calculator circuits.

Figure 2B:
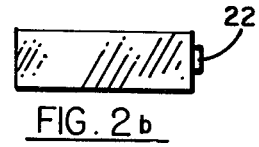
Figure 2A:
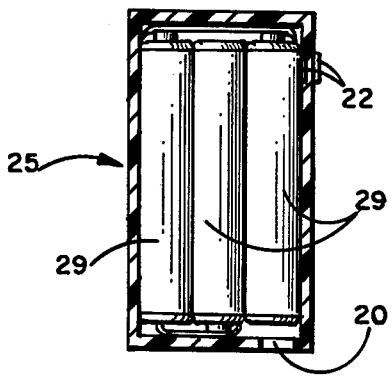
FIG. 2a is a partial cross-section of the rechargeable battery pack which forms part of the calculator driving and battery pack recharging circuit of the instant invention.
Figure 2C:
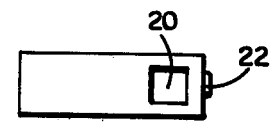

Referring now to FIGS. 2a–2c, the rechargeable battery pack 25 is illustrated. The secondary battery cells 29, which form the rechargeable battery pack 25, may be conventional nickel-cadmium batteries, or the like, encapsulated in a suitable material, such as, for example, plastic. The rechargeable battery pack 25 includes a window 20 formed in the bottom surface thereof. The window 20 provides a means by which to contact the terminals of the encapsulated battery cells 29. By way of example, and concurrently referring to FIG. 1, when battery pack 25 is inserted into the battery compartment 4 of calculator 1, window 20 is aligned to receive coiled spring contact 8-1. Moreover, and in a preferred embodiment, an external contact strip 22 is molded into the encapsulating material on one surface of the battery pack 25. When the battery pack 25 is properly inserted in the battery compartment 4 of the calculator 1, the contact strip 22 of the battery pack 25 is positioned to engage the contact 12 of the compartment 4 so as to, thereby, complete the calculator driving and battery pack recharging circuit. It will soon be apparent, however, that when disposable batteries are otherwise installed in the battery compartment 4 of the calculator 1, that portion of the driving and battery pack recharging circuit which includes the disposable batteries is open-circuited and, thereby, disabled.

Figure 3:
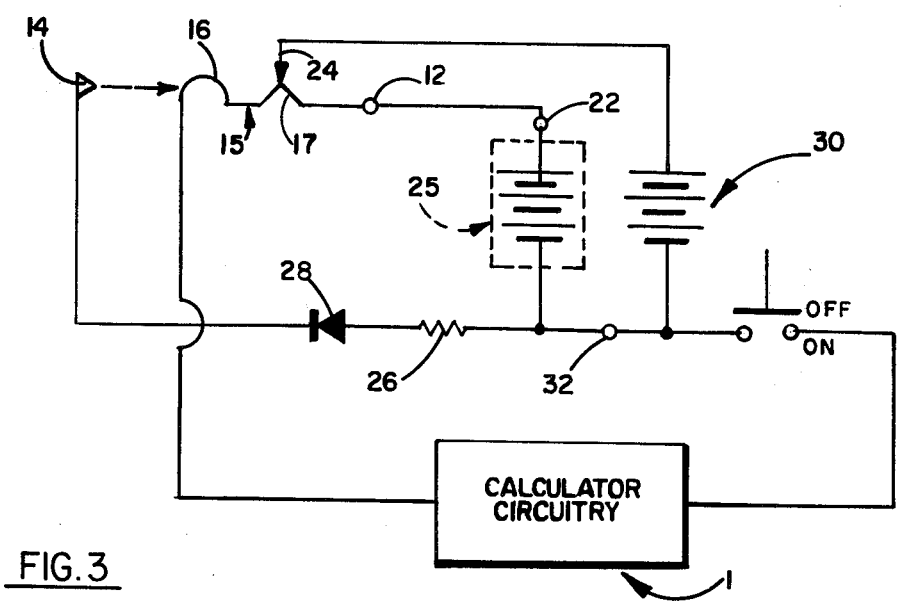
FIG. 3 is a schematic circuit diagram of the calculator driving and battery pack recharging circuit of the instant invention.

In accordance with the instant invention, FIG. 3 shows a preferred schematic diagram for implementing the calculator driving and battery pack recharging circuit. Unlike many conventional calculators, the calculator 1 is adapted to be internally powered by either one of the rechargeable battery pack 25 or a plurality of disposable batteries 30 inserted into the calculator battery compartment 4, illustrated in FIG. 1. What is more, by virtue of the unique battery pack 25 (as illustrated in FIGS. 2a-2c) and the presently disclosed calculator driving and battery pack recharging circuit, the rechargeable battery pack 25 and the disposable batteries 30 are conveniently and safely interchangeable with one another inside the battery compartment for providing power to drive the calculator circuits.

The instant driving and battery pack recharging circuit includes jack receptacle 14, a unidirectional current conducting means (such as a diode 28), a current limiting resistor means 26, the calculator on-off switch, the additional circuitry of calculator 1 and a first end 16 of the flat spring contact 15, each of which circuit elements is electrically connected together in series. When the calculator 1 is powered by an internal battery source, the rechargeable battery pack 25 is electrically connected between a second end 17 of the flat spring contact 15 and a common electrical junction 32 conveniently formed with resistor 26 and the calculator on-off switch. Otherwise, the disposable batteries 30 are electrically connected between a contact 24 and the common electrical junction 32. When the calculator 1 is powered by either one of the rechargeable or disposable battery sources, 25 or 30, contact 24 engages the second end 17 of the flat spring contact 15.

More particularly, when the calculator 1 is powered by the rechargeable battery pack 25 and the calculator on-off switch is depressed to the on position, a corresponding dc current path is established, which path includes the battery pack 25, the flat spring contact 15, the circuitry of calculator 1, the on-off switch and the return path to battery source 25. When the calculator is otherwise powered by the disposable batteries 30, a corresponding dc current path is established, which path includes batteries 30, the contact 24, the flat spring contact 15, the circuitry of calculator 1, the on-off switch and the return path to battery source 30.

When it is desirable to alternatively power the calculator from an external source of ac voltage, the jack means (not shown) of a suitable ac adapter is inserted into the jack receptacle 14. The ac adapter (not shown) includes conventional rectifying means to apply a dc output voltage to the jack receptacle 14. The insertion of the jack means forces the jack receptacle 14 into engagement with the first end 16 of the flat spring contact 15. When the jack receptacle 14 contacts the first end 16 of the flat spring contact 15, the second end 17 of the spring contact 15 is physically moved out of engagement with the contact 24. Therefore, when the adapter jack is inserted into receptacle 14, no dc voltage (i.e. rectified ac voltage) can be intentionally or inadvertently applied across the terminals of the disposable batteries 30, inasmuch as the jack receptacle 14 acts to break a portion of the circuit, at contact 24, between the disposable batteries 30 and the supply of dc voltage. Thus, should disposable batteries 30 be inserted into the battery compartment of the calculator 1 when the adapter jack is inserted into receptacle 14 to power the calculator 1, a corresponding dc current path is established, which path includes the first end 16 of the flat spring contact 15, the circuitry of the calculator 1, the on-off switch, resistor 26, diode 28 and the jack receptacle 14. The presently disclosed driving and battery pack recharging circuit eliminates the danger and prevents the damage that might occur as a result of applying a dc voltage across the terminals of disposable batteries, inasmuch as the possibility of a user exploding the disposable batteries inside the battery compartment is substantially reduced.

However, when the adapter jack is inserted into receptacle 14 to coincidentally power the calculator 1 and to recharge the battery pack 25, a corresponding dc current path is established, which path includes the first end 16 of the flat spring contact 15, the circuitry of calculator 1, the on-off switch, resistor 26, diode 28 and the jack receptacle 14. With the battery pack 25 is inserted in the calculator battery compartment, the dc current divides at electrical junction 32 to form an additional current path including the battery pack 25, the flat spring contact 15 and the jack receptacle 14. The battery pack 25 is, thereby, conveniently recharged for continued use.

It will be apparent that while a preferred embodiment of the invention has been shown and described, various modifications and changes may be made without departing from the true spirit and scope of the invention. For example, while the present driving and battery pack recharging circuit is utilized to power an electronic calculator, it is to be understood that the circuit can be employed in any device which is adapted to be driven by either a supply of dc or battery power.

Having thus set forth a preferred embodiment of the instant invention, what is claimed is:

1. A circuit adapted to be driven by a source of battery power or by a supply of d.c. power, said circuit comprising:

contact means having first and second ends to selectively connect one of a rechargeable battery source or a disposable, non-rechargeable battery source into said circuit for driving said circuit from said source of battery power, the first end of said contact means connected to the circuit to be driven, and the second end of said contact means having a first and a second contact, the second end of said contact means selectively connected to one of the rechargeable battery source by said first contact or to the disposable, non-rechargeable battery source by said second contact when said circuit is driven from said source of battery power, and terminal means adapted to apply a d.c. voltage to said circuit for alternatively driving said circuit from said supply of d.c. power, said terminal means moved into engagement with the first end of said contact means in order to apply the d.c. voltage to said rechargeable battery souce to thereby recharge said rechargeable battery source, and the second contact of the second end of said contact means accordingly being moved out of connection with said contact means in response to the movement of said terminal means to thereby electrically isolate said non-rechargeable battery source from said circuit and from said supply of d.c. power when said circuit is alternatively driven from said supply of d.c. power.

2. The circuit recited in claim 1, including electronic calculator means connected to said circuit to be powered thereby.

3. The circuit recited in claim 1, wherein said rechargeable battery source comprises a package of rechargeable battery cells, said package having a respective contact extending from the battery cells to the outside surface of said package, said respective contact adapted to interface with said contact means to thereby connect said rechargeable battery source into said circuit.

4. A circuit for alternatively driving a utilization means from either a source of battery power in a first circuit mode of operation or from a supply voltage main in a second circuit mode of operation, said source of battery power comprising either one of a rechargeable battery supply circuit on a non-rechargeable battery supply circuit, said driving circuit including:

first contact means having a first contact and a second contact, one of said first or second contacts adapted to be closed during the first circuit mode of operation to thereby respectively connect said rechargeable battery supply circuit by said first contact or said non-rechargeable battery supply circuit by said second contact into said driving circuit for driving said utilization means, and second contact means adapted to be closed during the second circuit mode of operation to thereby connect said supply voltage main to both said utilization means to drive said utilization means and to said rechargeable battery supply circuit to charge said rechargeable supply circuit, the closure of said second contact means during the second circuit mode of operation causing the second contact of said first contact means to open, whereby said non-rechargeable battery supply circuit is disconnected from said driving circuit.

5. The driving circuit recited in claim 4, wherein said second contact means includes a jack receptacle means and the first contact of said first contact means includes a resilient conductor means, the first and second contacts of said first contact means being mechanically connected to one another so that the insertion of a supply voltage main jack into the jack receptacle means of said second contact means during the second circuit mode of operation closes the second contact means and displaces the resilient conductor means of the first contact of said first contact means, whereby the second contact of said first contact means is opened to disconnect said non-rechargeable battery supply circuit from said driving circuit.

* * * * *